U. BOREL.
Stock-Feeders.
No. 145,984. Patented Dec. 30, 1873.
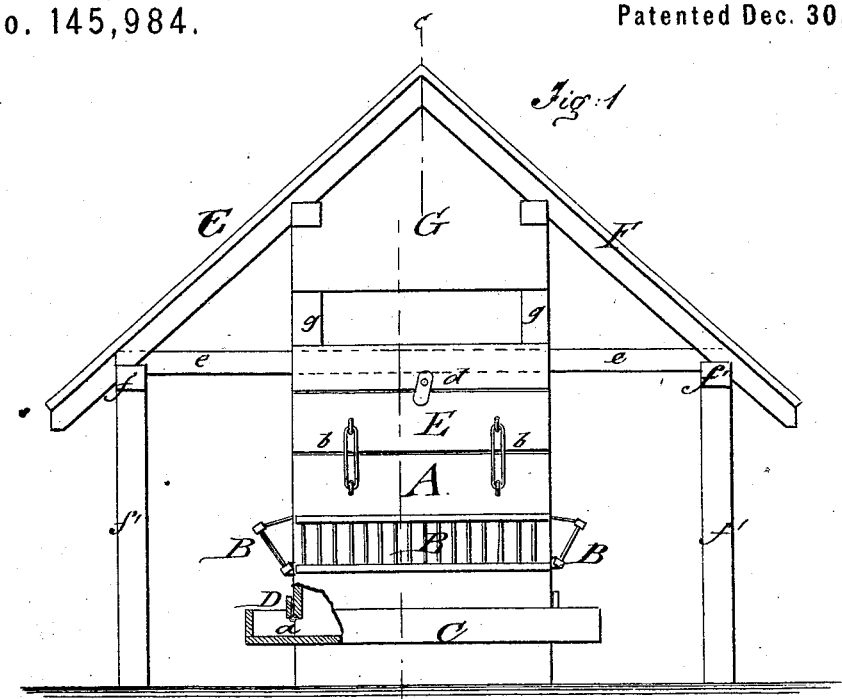
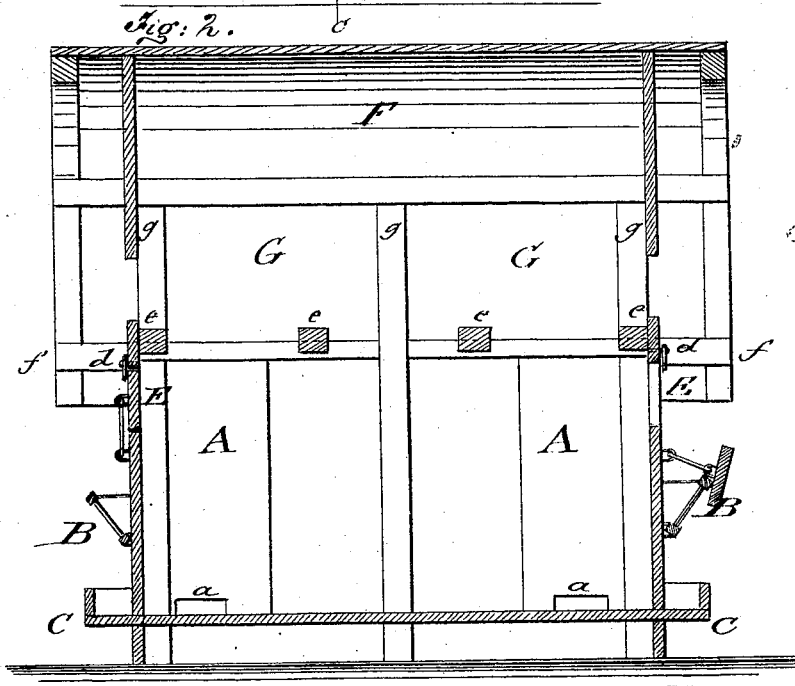

UNITED STATES PATENT OFFICE.

ULYSES BOREL, OF SUE CITY, MISSOURI.

IMPROVEMENT IN STOCK-FEEDERS.

Specification forming part of Letters Patent No. 145,984, dated December 30, 1873; application filed September 27, 1873.

*To all whom it may concern:*

Be it known that I, ULYSES BOREL, of Sue City, in the county of Macon and State of Missouri, have invented a new and Improved Combined Stock-Feeder and Barn, of which the following is a specification:

In the accompanying drawing, Figure 1 represents a front elevation of my improved stock-feeder and barn, partly in section; and Fig. 2, a vertical longitudinal section on the line *c c*, Fig. 1.

Similar letters of reference indicate corresponding parts.

The rectangular inclosure A is designed to contain the hay or feed for the stock. Racks B are applied to its outer side, below openings therein, which latter are closed by doors E. Said doors are attached to the sides of the inclosure by means of staples and long links *b*, and secured in the closed position by buttons *d*, or other suitable device. The arrangement is such that when the doors are opened or lowered they are supported on the racks B, by means of the links, as shown in Fig. 2, the inner side of the doors being in that case turned outward, and thus form upward continuations of the racks, enlarging their capacity, and aiding in preventing the hay from falling over them onto the ground, when thrust through the openings above from the interior of inclosure A.

If desired, the doors E may be left open, or in the position shown in Fig. 2, until the stock have consumed most or all of the feed, with the view to prevent the stock from pushing the hay out of the same and thereby wasting it.

Thus far I have described my invention alone. The gable roof F, which covers the inclosure A, is extended on the sides, and is supported by frame *e f* and posts *f'*, the object being to protect the stock while feeding from the racks.

For small animals, as sheep and swine, I find it expedient to employ the trough C, which communicates with interior of inclosure A by openings *a*, which latter are provided with sliding doors or gates D. I do not, however, claim either of these features.

What I do claim as new and of my invention is—

In combination with the stock-inclosure A, provided with feed-openings, the racks B and doors E, the latter being attached by staples and links, as shown and described, whereby they are adapted to be supported upon the racks, when open, as and for the purpose specified.

ULYSES BOREL.

Witnesses:
J. M. NORRIS,
J. R. GOODDING.